United States Patent
Jones et al.

(10) Patent No.: US 11,427,081 B1
(45) Date of Patent: Aug. 30, 2022

(54) SYSTEM AND METHOD FOR DETECTING TORQUE TRAP IN A VEHICLE DRIVETRAIN

(71) Applicant: Ford Global Technologies, LLC, Dearborn, MI (US)

(72) Inventors: Kristopher Jones, Novi, MI (US); Filip Tomik, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/240,233

(22) Filed: Apr. 26, 2021

(51) Int. Cl.
| | |
|---|---|
| *B60K 23/08* | (2006.01) |
| *B60W 50/14* | (2020.01) |
| *B60W 10/119* | (2012.01) |
| *B60K 17/344* | (2006.01) |

(52) U.S. Cl.
CPC ........ *B60K 23/0808* (2013.01); *B60K 17/344* (2013.01); *B60W 50/14* (2013.01); *B60W 10/119* (2013.01); *B60W 2050/143* (2013.01); *B60W 2050/146* (2013.01); *B60W 2520/10* (2013.01); *B60W 2520/12* (2013.01); *B60W 2520/40* (2013.01)

(58) Field of Classification Search
CPC ............. B60K 23/0808; B60K 17/344; B60W 10/119; B60W 50/14; B60W 2050/143; B60W 2050/146; B60W 2520/10; B60W 2520/12; B60W 2520/40
See application file for complete search history.

(56) References Cited

U.S. PATENT DOCUMENTS

| | | | | |
|---|---|---|---|---|
| 4,989,686 A | * | 2/1991 | Miller ................ | B60K 23/0808 701/87 |
| 5,813,490 A | * | 9/1998 | Takasaki ............ | B60K 23/0808 180/250 |
| 6,044,320 A | * | 3/2000 | Stuible .................... | B60T 8/885 701/72 |
| 10,144,284 B2 | | 12/2018 | Christensen et al. | |
| 2001/0042652 A1 | * | 11/2001 | Watson ................. | F16D 27/115 180/244 |

FOREIGN PATENT DOCUMENTS

| | | | | |
|---|---|---|---|---|
| EP | 1342608 A2 | * | 9/2003 | ............. B60K 23/04 |
| JP | 2008126863 | | 6/2008 | |
| KR | 1020190001826 | | 1/2019 | |

* cited by examiner

Primary Examiner — Tisha D Lewis
(74) Attorney, Agent, or Firm — Burris Law, PLLC

(57) ABSTRACT

A system including a first drive axle, a second drive axle, a first sensor, a second sensor, and a controller. The first sensor is configured to measure a first speed of the first drive axle. The second sensor is configured to measure a second speed of the second drive axle. The controller is in communication with the first and second sensors. The controller configured to determine an actual axle speed difference value based on the measured first speed and the measured second speed, determine an expected axle speed difference value based on a vehicle speed and a vehicle torque, compare the actual axle speed difference value and the expected axle speed difference value to obtain an error value, and generate an output signal in response to the error value being above a predetermined threshold value.

20 Claims, 3 Drawing Sheets

SYSTEM AND METHOD FOR DETECTING TORQUE TRAP IN A VEHICLE DRIVETRAIN

FIELD

The present disclosure relates to a system and method for detecting torque trap in a vehicle drivetrain.

BACKGROUND

The statements in this section merely provide background information related to the present disclosure and may not constitute prior art.

Some vehicles include a powertrain system and a drivetrain system. Rotary power (vehicle torque) generated by the powertrain system is transmitted to the drivetrain system which causes the vehicle to move. The drivetrain system may include, inter alia, one or more propeller shafts (also referred to as propshafts) and a plurality of axles. Some vehicles may be operable in a plurality of drive modes for providing drive torque to more than one axle. For example, some vehicles may be operable in a first driving mode (e.g., four-wheel-drive) and a second driving mode (e.g., two-wheel-drive) in which fewer axles are driven than in the first drive mode. Such vehicles may be shifted from the first driving mode to the second driving mode automatically or manually (via an operator's input). Shifting the drivetrain from the first drive mode to the second drive mode causes a disconnect mechanism (e.g., a coupling or clutch) to disconnect torque transmission from the powertrain to one or more secondary axles of the vehicle while torque from the powertrain is still provided to one or more primary axles of the vehicle. In some situations, the disconnect mechanism may remain in the connected position despite an attempt to shift the drivetrain from the first mode to the second mode, particularly when torque is being transferred through the disconnect mechanism while attempting to perform the shift. This condition is commonly known as torque trap or torque lock.

The present disclosure provides a method and a system that addresses these and other issues associated with vehicle drivetrains.

SUMMARY

This section provides a general summary of the disclosure and is not a comprehensive disclosure of its full scope or all of its features.

In one form, the present disclosure discloses a system for detecting whether a vehicle has shifted from a first drive mode to a second drive mode in which fewer axles are driven than in the first drive mode. The system including a first drive axle, a second drive axle, a first sensor, a second sensor, and a controller. The first drive axle is configured to drive a first set of vehicle wheels. The second drive axle is configured to drive a second set of vehicle wheels. The first sensor is configured to measure a first speed of the first drive axle. The second sensor is configured to measure a second speed of the second drive axle. The controller is in communication with the first and second sensors. The controller is configured to determine an actual axle speed difference value based on the measured first speed and the measured second speed, determine an expected axle speed difference value based on a vehicle speed and a vehicle torque, compare the actual axle speed difference value and the expected axle speed difference value to obtain an error value, and generate an output signal in response to the error value being above a predetermined threshold value.

In some configurations, the expected speed difference value is determined based on a reference table stored in a memory of the controller.

In some configurations, the controller generates the output signal in response to the error value being above the predetermined threshold value for a predetermined time period.

In some configurations, the controller is further configured to determine if there is dynamic driving of the vehicle in response to the error value being above the predetermined threshold value and generate the output signal in response to the error value being above the predetermined threshold value and the determination that there is dynamic driving of the vehicle.

In some configurations, the output signal is configured to: generate an alert, operate a vehicle drive system to reduce the vehicle torque, operate a shift system, or combinations thereof.

In some configurations, the output signal is configured to generate an alert. The alert being at least one of an audible or visual alert indicating the vehicle is trapped in the first drive mode.

In some configurations, the predetermined threshold value is based at least in part on the vehicle speed and the vehicle torque.

In some configurations, the output signal is configured to generate an alert, operate a vehicle drive system to reduce the vehicle torque, operate a shift system, or combinations thereof.

In some configurations, the first drive mode is a four-wheel-drive mode and the second drive mode is a two-wheel-drive mode.

In some configurations, the output signal is configured to generate an alert. The alert being at least one of an audible or visual alert indicating the vehicle is trapped in the first drive mode.

In another form, the present disclosure discloses a system for detecting whether a vehicle has shifted from a first drive mode to a second drive mode in which fewer axles are driven than in the first drive mode. The system including a first drive axle, a second drive axle, a transfer case, a first sensor, a second sensor, a third sensor, and a controller. The first drive axle is configured to drive a first set of vehicle wheels. The second drive axle is configured to drive a second set of vehicle wheels. The transfer case includes an actuator and a coupling. The coupling being operable in a first state in which the first and second drive axles receive power from the transfer case and a second state in which only one of the first and second drive axles receive power from the transfer case. The actuator being configured to move the coupling between the first and second states. The first sensor is configured to measure a first speed of a first drive axle. The second sensor is configured to measure a second speed of a second drive axle. The third sensor is configured to determine a coupling position of the transfer case. The controller is in communication with the first, second, and third sensors, and the actuator. The controller is configured to operate the actuator, determine an actual axle speed difference value based on the measured first speed and the measured second speed, determine an expected axle speed difference value based on a vehicle speed and a vehicle torque, compare the actual axle speed difference value and the expected axle speed difference value to obtain an error value, determine whether the coupling of the transfer case has moved from the first state to the second state based on the error value, and generate an output signal in response to the coupling being in the first state.

In some configurations, the expected speed difference value is determined based on a reference table stored in a memory of the controller.

In some configurations, the output signal is configured to generate an alert indicating the vehicle is trapped in the first drive mode.

In some configurations, the controller is further configured to determine if there is dynamic driving of the vehicle in response to the error value being above a predetermined threshold value and generate the output signal in response to the error value being above the predetermined threshold value and the determination that there is dynamic driving.

In some configurations, the output signal is configured to generate an alert, operate a vehicle drive system to reduce the vehicle torque, operate a shift system, or combinations thereof.

In some configurations, the output signal is configured to generate an alert. The alert being at least one of an audible alert or visual alert indicating the vehicle is trapped in the first drive mode.

In yet another form, the present disclosure discloses a method for detecting whether a vehicle has shifted from a first drive mode to a second drive mode in which fewer axles are driven than in the first drive mode. The method including measuring, using a first sensor, a first speed of a first drive axle of the vehicle, measuring, using a second sensor, a second speed of a second drive axle of the vehicle, determining, using a controller, an actual axle speed difference value based on the measured first speed and the measured second speed, determining, using the controller, an expected axle speed difference value based on a vehicle speed and a vehicle torque, comparing, using the controller, the actual axle speed difference value and the expected axle speed difference value to obtain an error value, and generating an output signal, using the controller, in response to the error value being above a predetermined threshold value.

In some configurations, the method further includes automatically reducing vehicle torque, using the controller, in response to the error value being above a predetermined threshold value.

In some configurations, the method further includes automatically actuating an actuator, using the controller, in response to reducing the vehicle torque.

In some configurations, the method further includes determining, using the controller, if there is dynamic driving of the vehicle in response to the error value being above the predetermined threshold value and generating the output signal, using the controller, in response to the error value being above the predetermined value and the determination that there is dynamic driving of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
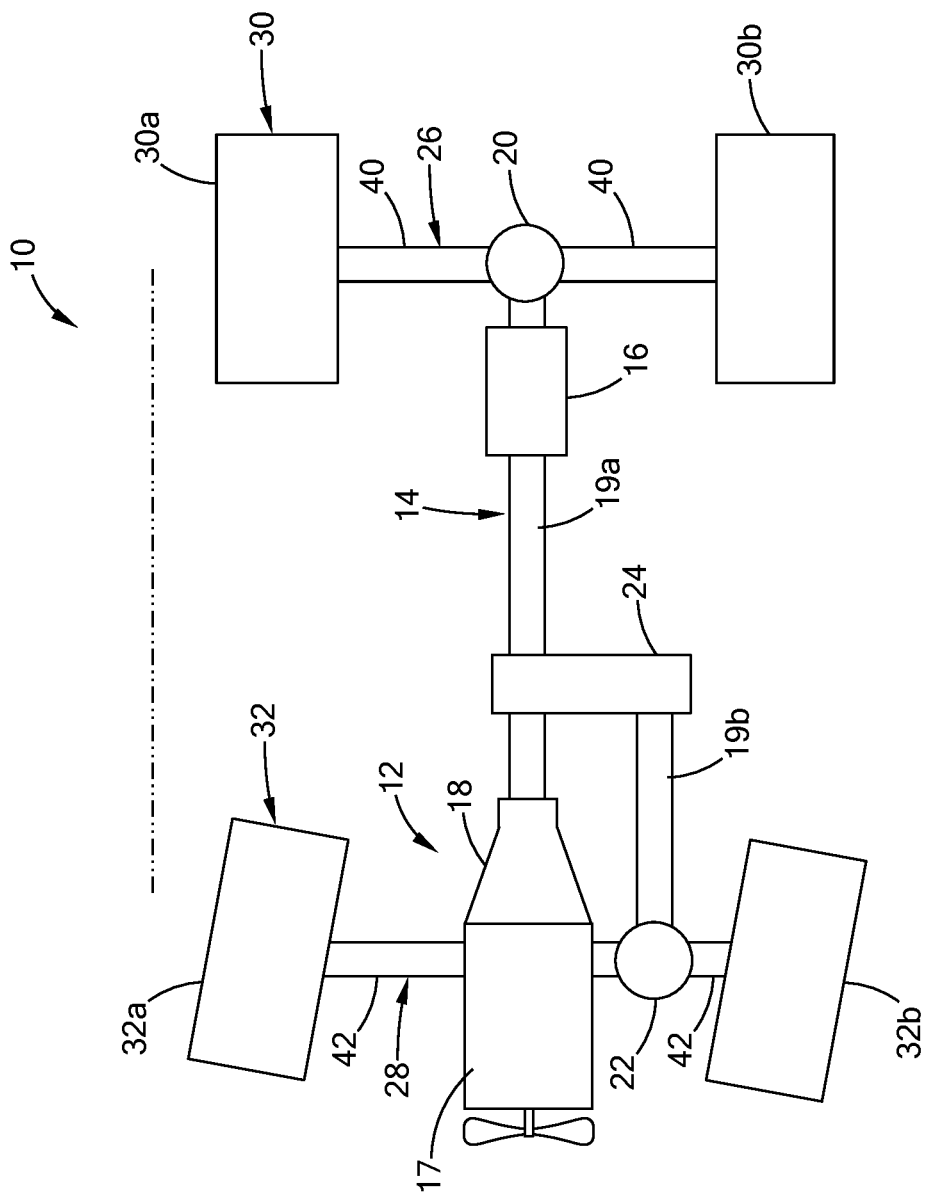
FIG. 1 is a schematic view of an example vehicle including a torque trap detection system according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
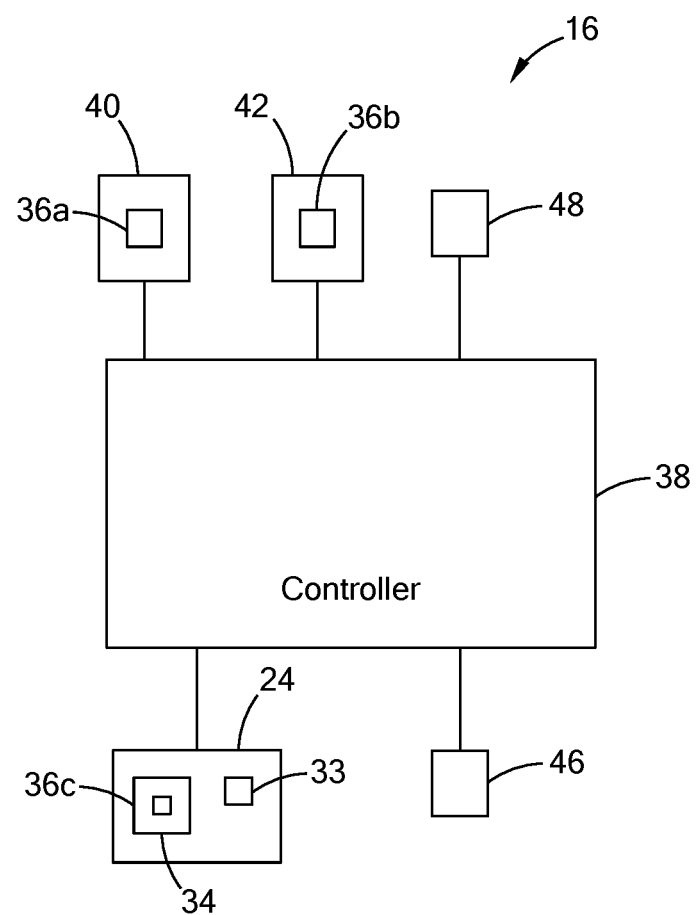
FIG. 2 is a block diagram schematically showing components of the torque trap detection system of FIG. 1.

With reference to FIGS. 1 and 2, a vehicle 10 is provided that includes a powertrain system 12 (FIG. 1), a drivetrain system 14 (FIG. 1), and a torque trap detection system 16 (FIG. 2). The vehicle 10 is operable between a first drive mode (e.g., a four-wheel-drive mode) and a second drive mode (e.g., a two-wheel-drive mode). The systems 12, 14 can be conventional systems, for example. In the particular configuration shown in FIG. 1, the powertrain system 12 includes, inter alia, an engine 17 and a transmission 18. The drivetrain system 14 includes, inter alia, rear and front propeller shafts 19a, 19b, a rear differential 20, a front differential 22, a power splitting gearset (e.g., a transfer case 24), a primary or first drive axle 26, and a secondary or second drive axle 28. Rotary power (vehicle torque) generated by the powertrain system 12 is transmitted to the drivetrain system 14. That is, in the second drive mode, rotary power generated by the powertrain system 12 is transmitted to the first drive axle 26 via the rear propeller shaft 19a to drive a set of rear wheels 30 (e.g., the set of rear wheels 30 includes a first wheel 30a and a second wheel 30b) but rotary power from the powertrain 14 is not transmitted to the second drive axle 28. The rear differential 20 is operatively connected to the rear propeller shaft 19a and the first drive axle 26, and allows the set of rear wheels 30 to rotate at the same speed or at different speeds. In an alternative configuration, the front axle 28 can be the primary drive axle such that rotary power from the powertrain 14 is transmitted to the front axle 28 but not the rear axle 26 when in the second drive mode. In such an example, the power splitting gearset can be a power take-off unit (PTU) rather than a transfer case and be configured to selectively disconnect the rear propeller shaft 19a.

In the first drive mode, rotary power generated by the powertrain system 12 is transmitted to the first drive axle 26 (via the rear propeller shaft 19a) and the second drive axle 28 (via the front propeller shaft 19b). In this way, the first drive axle 26 drives the set of rear wheels 30 and the second drive axle 28 drives a set of front wheels 32 (e.g., the set of front wheels 32 includes a first wheel 32a and a second wheel 32b). The front differential 22 is operatively connected to the front propeller shaft 19b and the second drive axle 28, and allows the set of front wheels 32 to rotate at the same speed or at different speeds.

The transfer case 24 is connected to the rear propeller shaft 19a and selectively connected to the front propeller shaft 19b. As shown in FIG. 2, the transfer case 24 includes a clutch or coupling 33 and an actuator 34 (e.g., a motor). The transfer case 24 is operable in the first mode in which rotary power generated by the powertrain system 12 powers the first and second drive axles 26, 28 and the second mode in which rotary power generated by the powertrain system 12 powers only the first drive axle 26.

The coupling 33 has an output member (not specifically shown) that is drivingly connected to the front propeller shaft 19*b* to provide rotary power thereto and an input member (not specifically shown) that is configured to receive rotary power from the transmission 18 such as via gearing (not shown) within the transfer case 24. The coupling 33 is movable between a first state in which the input and output members of the coupling 33 are engaged to transmit rotary power from the transmission 18 to the front propeller shaft 19*b* and a second state in which the input and output members of the coupling 33 are disengaged from each other so that rotary power is not transferred from the transmission 18 to the front propeller shaft 19*b*. In one form, the coupling 33 is a dog clutch and the input member and the output member have mating teeth that are engaged when the coupling 33 is in the first state and disengaged when the coupling 33 is in the second state. When the coupling 33 is in the first state, the transfer case 24 is in the first mode, and when the coupling 33 is in the second state, the transfer case 24 is in the second mode. The actuator 34 is operable to move the coupling 33 between the first state and the second state. For example, the actuator 34 can be coupled to the input member and/or the output member of the coupling 33 to move the input member and/or the output member of the coupling 33. The actuator 34 can be any suitable type of actuator (e.g., a linear actuator, a solenoid, a piston cylinder, a rotary actuator). Torque trap of the coupling 33 may occur in some situations when a threshold amount of torque is being actively transferred between the input member and the output member. When torque trap of the coupling 33 occurs, the coupling 33 remains engaged despite the actuator 34 attempting to disengage the coupling 33.

The torque trap detection system 16 includes a plurality of sensors 36*a*, 36*b*, 36*c* and a controller 38. The sensor 36*a* is associated with a respective rear half shaft 40 (e.g., coupled to the rear half shaft 40 or fixed to an adjacent component (not shown; e.g., a steering knuckle or housing of the differential 20 or rear axle 26) and having a sensor target coupled to the rear half shaft 40) and is configured to measure a parameter indicative of rotational speed of the rear half shaft 40. For example, the sensor 36*a* may be a tachometer and may measure the revolutions per minute (RPM) of the respective rear half shaft 40. The sensor 36*b* is associated with a respective front half shaft 42 (e.g., coupled to the front half shaft 42 or fixed to an adjacent component (e.g., a steering knuckle or housing of the differential 22 or front axle 28) and having a sensor target coupled to the front half shaft 42) and is configured to measure a parameter indicative of rotational speed of the half shaft 42. For example, the sensor 36*b* may be a tachometer and may measure the revolutions per minute (RPM) of the respective front half shaft 42. The sensor 36*c* is associated with the actuator 34 (e.g., coupled to the actuator 34 or configured to detect a target that is coupled to a moving component of the actuator 34) and is configured to detect the coupling 33 position such as by detecting the position of the moving component of the actuator 34. In some configurations, the sensor 36*c* may be associated with the coupling 33 (e.g., coupled to the coupling 33 or configured to detect a target that is coupled to the coupling 33) and is configured to detect the coupling 33 position.

The controller 38 is in communication with the sensors 36*a*, 36*b*, 36*c*, and the transfer case 24, such as the actuator 34 for example. The controller 38 may also be in communication with a vehicle speed sensor 46 that is configured to measure a speed of the vehicle 10 and a vehicle torque sensor 48 configured to measure a vehicle torque. The vehicle torque sensor 48 may be a rotary torque sensor, for example, and may be associated with an output shaft (not shown) of the powertrain system 12 (e.g., coupled to the output shaft or may be fixed to a housing (not shown) and having a sensor target coupled to the output shaft). The controller 38 may generate an output signal indicative of whether the vehicle 10 has shifted from the first drive mode to the second drive mode based at least in part on the data provided by one or more of the sensors 36*a*, 36*b*, 36*c*, 46, 48. The controller 38 may also be configured to operate the transfer case 24 (e.g., the controller 38 may operate the actuator 34 to move the coupling 33 between the first state and the second state).

Figure 3:
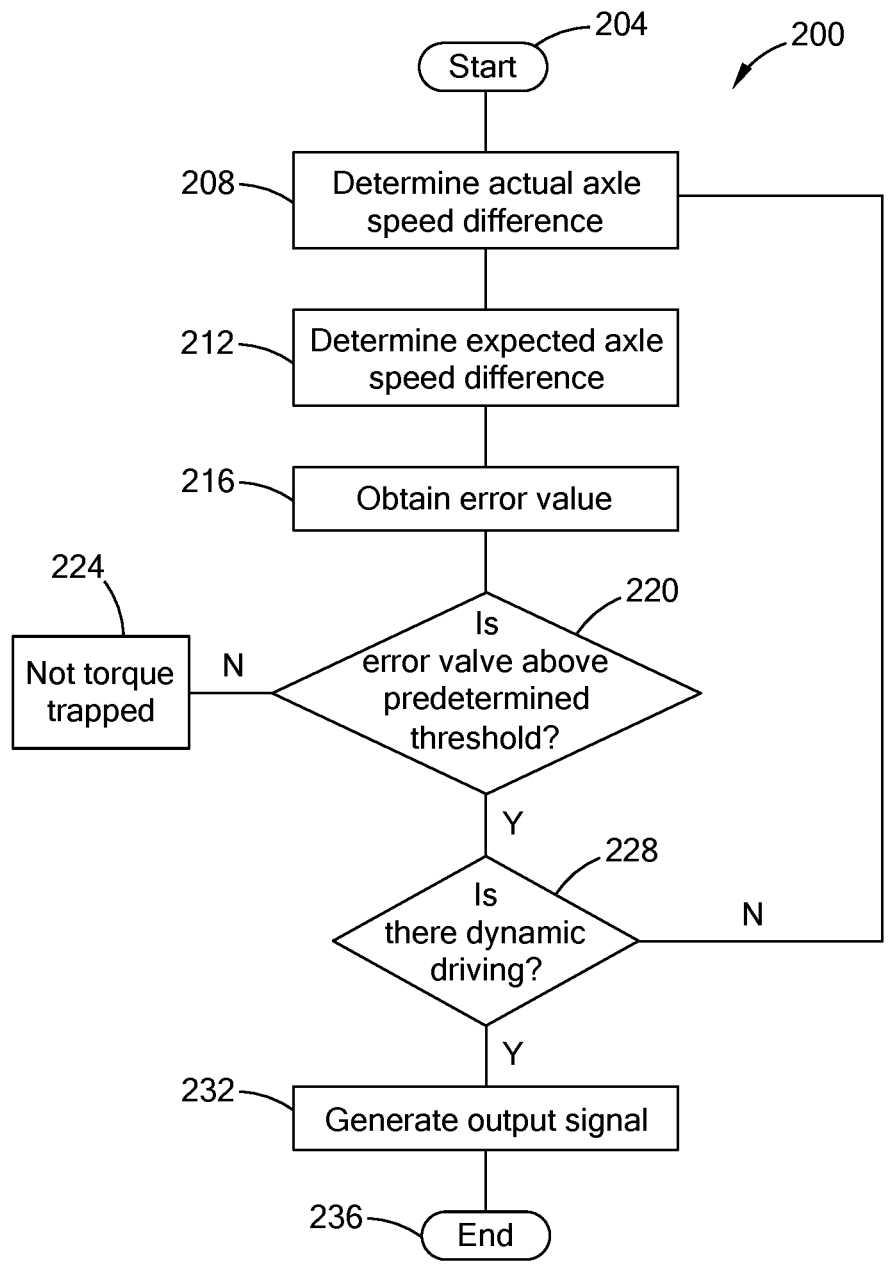
FIG. 3 is a flowchart depicting an algorithm for detecting torque trap in the vehicle in accordance with the teachings of the present disclosure, for use by the torque trap detection system of FIG. 1.

With reference to FIG. 3, a flowchart 200 showing an example implementation of a control algorithm or method for torque trap detection in a vehicle is shown. The control algorithm begins at 204 when an attempt is made to shift the vehicle 10 from the first drive mode to the second drive mode. For example, the vehicle operator or a different control algorithm (via the vehicle's ECU or other control module, which may or may not be the same component as the controller 38) may provide an input signal indicative of a desire to shift the vehicle 10 from the first drive mode to the second drive mode. When the attempt is made to shift the vehicle 10 from the first drive mode to the second drive mode, the controller 38 operates the actuator 34 to attempt to move the coupling 33 from the first state to the second state. At 208, the control algorithm, using the controller 38, determines an actual axle speed difference value between the first drive axle 26 and the second drive axle 28. That is, a speed of the first drive axle 26 is measured using the sensor 36*a* and a speed of the second drive axle 28 is measured using the sensor 36*b*. The controller 38 then compares both speeds to determine the actual axle speed difference value. After determining the actual axle speed difference value between the first drive axle 26 and the second drive axle 28, the control algorithm then proceeds to 212.

At 212, the control algorithm, using the controller 38, determines an expected axle speed difference value. That is, the expected axle speed difference value between the first drive axle 26 and the second drive axle 28 may be calculated or determined from a lookup or reference table based on the vehicle speed and the vehicle torque. Stated differently, for a given vehicle speed and vehicle torque, the expected axle speed difference value between the first drive axle 26 and the second drive axle 28 may be determined using the reference table. After determining the expected axle speed difference value between the first drive axle 26 and the second drive axle 28, the control algorithm then proceeds to 216.

At 216, the control algorithm, using the controller 38, compares the actual axle speed difference value and the expected axle speed difference value to obtain an error value. That is, the error value is obtained using the following formula Error value=|A-E|/|E|*100, where A is actual axle speed difference value and E is the expected axle speed difference value. After obtaining the error value, the control algorithm then proceeds to 220.

At 220, the control algorithm, using the controller 38, determines if the error value is above a predetermined threshold value. The predetermined threshold value may be based in part on the vehicle speed and/or the vehicle torque. For example, the predetermined threshold value may be greater if the vehicle 10 is travelling at 112 kilometers per hour (i.e., 70 miles per hour) as compared to the vehicle 10 travelling at 48 kilometers per hour (i.e., 30 miles per hour).

In another example, the predetermined threshold may be greater if the vehicle torque is greater, such as when accelerating compared to when coasting or decelerating. In another example, the predetermined threshold value may be the same regardless of vehicle speed and/or vehicle torque. In some configurations, the error value may need to be above the predetermined threshold value for a predetermined time period. In such configurations, the predetermined time period is based in part on the vehicle speed and/or the vehicle torque. For example, the predetermined time period may be less if the vehicle 10 is travelling at 112 kilometers per hour as compared to the vehicle 10 travelling at 48 kilometers per hour. In another example, the predetermined time period may be greater if the vehicle torque is lower, such as while coasting or decelerating for example. In another example, the predetermined time period may be the same regardless of vehicle speed and/or vehicle torque. In yet another example, the predetermined time period may be based in part on operating conditions of the vehicle 10 (e.g., whether or not the vehicle 10 will overheat if it remains torque trapped for too long or too short of a time period).

If the error value is below the predetermined threshold value, the control algorithm proceeds to 224, where the controller 38 determines that the vehicle 10 is not torque trapped (i.e., the vehicle 10 has properly shifted from the first drive mode to the second drive mode). The controller 38 may then optionally output a signal indicative of the vehicle being in the second drive mode. The process may be repeated continuously or at predetermined time intervals or if and when the vehicle operator shifts the vehicle 10 again from the first drive mode to the second drive mode.

If the error value is above the predetermined threshold value, the control algorithm proceeds to 228. At 228, the control algorithm, using the controller 38, determines if there is evidence of dynamic driving in the vehicle 10. As used herein, dynamic driving may include, for example, whether the vehicle speed or the vehicle torque has been modulated (e.g., acceleration or increased request for vehicle torque such as the operator applying the accelerator pedal). By taking into account dynamic driving of the vehicle 10, the system 16 protects against false detection and ensures the error value being above the predetermined threshold value is due to torque trapping and not a separate condition such as the vehicle 10 having mismatched tires or wheel slip, for example. If there is no evidence of dynamic driving, the control algorithm proceeds to 208; otherwise, the control algorithm proceeds to 232.

At 232, the control algorithm, using the controller 38, generates an output signal. In one example, the output signal is configured to generate an alert to the operator indicating the vehicle 10 is trapped in the first drive mode. The alert may be an audible alert and/or a visual alert. In this way, the operator of the vehicle 10 is directed to rectify the vehicle 10 being torque trapped. In another example, the output signal is configured to generate an alert, operate the vehicle powertrain system 12 to reduce the vehicle torque, operate a shift system (e.g., the actuator 34), or combinations thereof. The control algorithm then proceeds to 236 and ends where it may be ready to return to 204.

It should be understood that the process for detecting torque trap in a vehicle drivetrain as described above may be turned off if it is determined that certain vehicle conditions are known. For example, if one of more of the sensors 36a, 36b are not working, the process for detecting torque trap in the vehicle drivetrain may be turned off. It should also be understood that although the process for detecting torque trap in a vehicle drivetrain is described herein with respect to a four-wheel-drive vehicle, the system and method may also be applicable for other vehicles such an all-wheel-drive vehicle, a vehicle that automatically switches between the first and second drive modes without input from the operator), or vehicles where there exists a plurality of drive modes such as a first drive mode and a second drive mode in which fewer axles are driven than in the first drive mode (e.g., vehicles with more than two drive axles).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for detecting whether a vehicle has shifted from a first drive mode to a second drive mode in which fewer axles are driven than in the first drive mode, the system comprising:
   a first drive axle configured to drive a first set of vehicle wheels;
   a second drive axle configured to drive a second set of vehicle wheels;
   a first sensor configured to measure a first speed of the first drive axle;
   a second sensor configured to measure a second speed of the second drive axle; and
   a controller in communication with the first and second sensors, the controller configured to:
      determine an actual axle speed difference value based on the measured first speed and the measured second speed;
      determine an expected axle speed difference value based on a vehicle speed and a vehicle torque;
      compare the actual axle speed difference value and the expected axle speed difference value to obtain an error value; and
      generate an output signal in response to the error value being above a predetermined threshold value, the output signal configured to generate an alert indicating the vehicle is trapped in the first drive mode.

2. The system of claim 1, wherein the expected axle speed difference value is determined based on a reference table stored in a memory of the controller.

3. The system of claim 1, wherein the controller generates the output signal in response to the error value being above the predetermined threshold value for a predetermined time period.

4. The system of claim 1, wherein the controller is further configured to:
   determine if there is dynamic driving of the vehicle in response to the error value being above the predetermined threshold value; and
   generate the output signal in response to the error value being above the predetermined threshold value and the determination that there is dynamic driving of the vehicle.

5. The system of claim 4, wherein the output signal is configured to: operate a vehicle drive system to reduce the vehicle torque and/or operate a shift system.

6. The system of claim 4, wherein the alert being at least one of an audible or visual alert indicating the vehicle is trapped in the first drive mode.

7. The system of claim 1, wherein the predetermined threshold value is based at least in part on the vehicle speed and the vehicle torque.

8. The system of claim 1, wherein the output signal is configured to: operate a vehicle drive system to reduce the vehicle torque and/or operate a shift system.

9. The system of claim 1, wherein the first drive mode is a four-wheel-drive mode and the second drive mode is a two-wheel-drive mode.

10. The system of claim 1, wherein the alert being at least one of an audible or visual alert indicating the vehicle is trapped in the first drive mode.

11. A system for detecting whether a vehicle has shifted from a first drive mode to a second drive mode in which fewer axles are driven than in the first drive mode, the system comprising:
   a first drive axle configured to drive a first set of vehicle wheels;
   a second drive axle configured to drive a second set of vehicle wheels;
   a transfer case or power take-off unit including an actuator and a coupling, the coupling being operable in a first state in which the first and second drive axles receive power from the transfer case or power take-off unit and a second state in which only one of the first and second drive axles receive power from the transfer case or power take-off unit, the actuator being configured to move the coupling between the first and second states;
   a first sensor configured to measure a first speed of a first drive axle;
   a second sensor configured to measure a second speed of a second drive axle;
   a third sensor configured to determine a coupling position of the transfer case or power take-off unit; and
   a controller in communication with the first, second, and third sensors, and the actuator, the controller configured to:
      operate the actuator;
   determine an actual axle speed difference value based on the measured first speed and the measured second speed;
      determine an expected axle speed difference value based on a vehicle speed and a vehicle torque;
      compare the actual axle speed difference value and the expected axle speed difference value to obtain an error value;
      determine whether the coupling of the transfer case or power take-off unit has moved from the first state to the second state based on the error value; and
      generate an output signal in response to the coupling being in the first state.

12. The system of claim 11, wherein the expected axle speed difference value is determined based on a reference table stored in a memory of the controller.

13. The system of claim 11, wherein the output signal is configured to generate an alert indicating the vehicle is trapped in the first drive mode.

14. The system of claim 11, wherein the controller is further configured to:
   determine if there is dynamic driving of the vehicle in response to the error value being above a predetermined threshold value; and
   generate the output signal in response to the error value being above the predetermined threshold value and the determination that there is dynamic driving.

15. The system of claim 14, wherein the output signal is configured to: generate an alert, operate a vehicle drive system to reduce the vehicle torque, operate a shift system, or combinations thereof.

16. The system of claim 14, wherein the output signal is configured to generate an alert, the alert being at least one of an audible alert or visual alert indicating the vehicle is trapped in the first drive mode.

17. A method for detecting whether a vehicle has shifted from a first drive mode to a second drive mode in which fewer axles are driven than in the first drive mode, the method comprising:
   measuring, using a first sensor, a first speed of a first drive axle of the vehicle;
   measuring, using a second sensor, a second speed of a second drive axle of the vehicle;
   determining, using a controller, an actual axle speed difference value based on the measured first speed and the measured second speed;

determining, using the controller, an expected axle speed difference value based on a vehicle speed and a vehicle torque;

comparing, using the controller, the actual axle speed difference value and the expected axle speed difference value to obtain an error value; and generating an output signal, using the controller, in response to the error value being above a predetermined threshold value, the output signal configured to generate an alert indicating the vehicle is trapped in the first drive mode.

18. The method of claim 17, further comprising automatically reducing vehicle torque, using the controller, in response to the error value being above a predetermined threshold value.

19. The method of claim 18, further comprising automatically actuating an actuator, using the controller, in response to reducing the vehicle torque.

20. The method of claim 17, further comprising:

determining, using the controller, if there is dynamic driving of the vehicle in response to the error value being above the predetermined threshold value; and generating the output signal, using the controller, in response to the error value being above the predetermined threshold value and the determination that there is dynamic driving of the vehicle.

* * * * *